Oct. 8, 1957  G. K. MURPHY  2,808,787
HIGH CAPACITY PRIVATE COMPARTMENT PASSENGER VEHICLE
Filed March 23, 1953  7 Sheets-Sheet 1
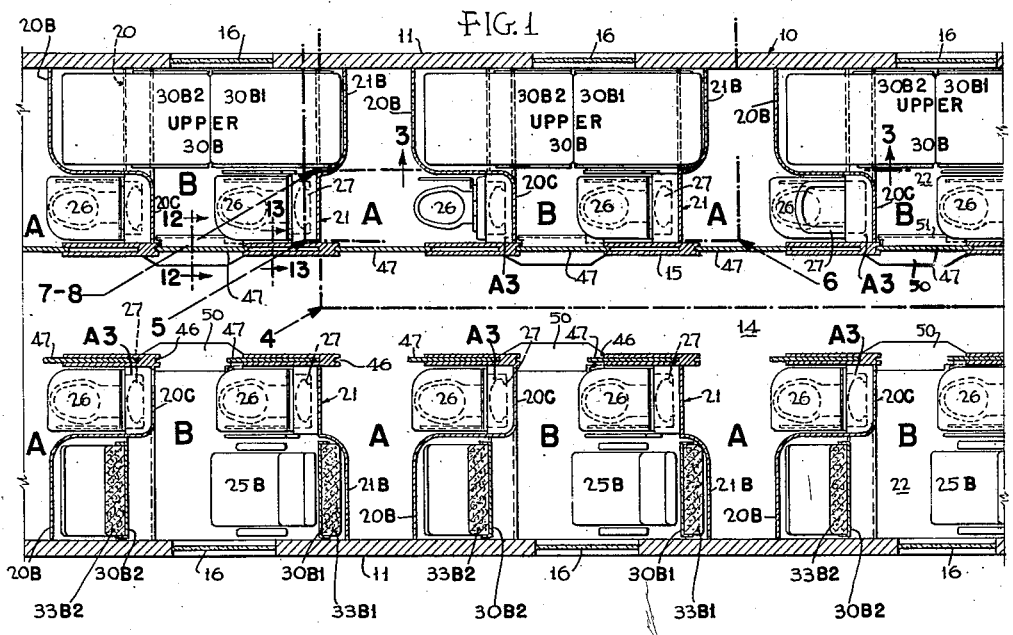
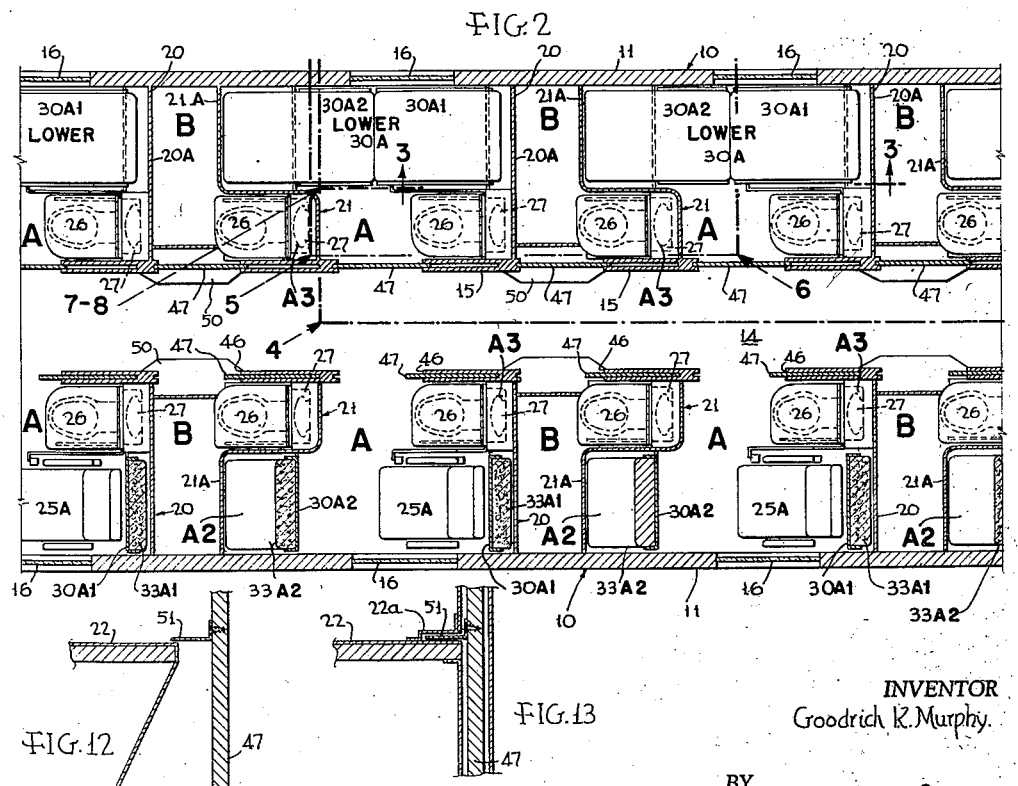
INVENTOR
Goodrich K. Murphy.
BY Maurice A. Crews
ATTORNEY Oct. 8, 1957  G. K. MURPHY  2,808,787
HIGH CAPACITY PRIVATE COMPARTMENT PASSENGER VEHICLE
Filed March 23, 1953  7 Sheets-Sheet 2
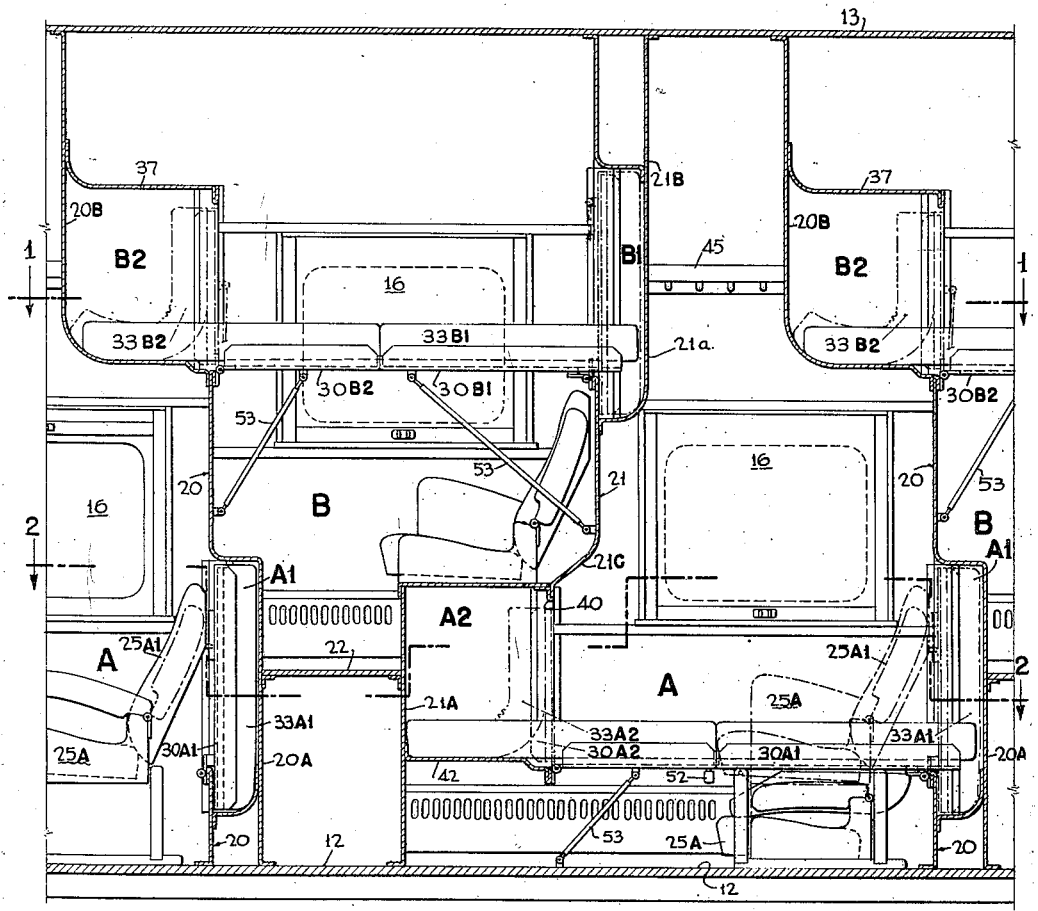
FIG.3
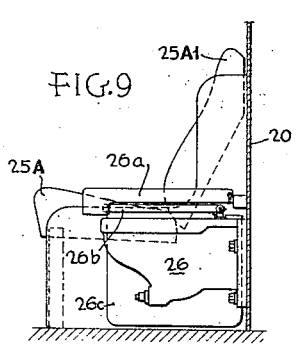
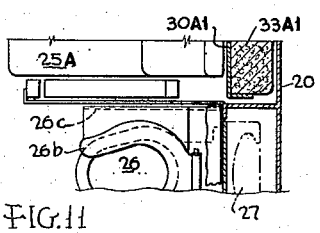
INVENTOR
Goodrich K. Murphy.
BY
ATTORNEY INVENTOR.
Goodrich K. Murphy.

Oct. 8, 1957  G. K. MURPHY  2,808,787
HIGH CAPACITY PRIVATE COMPARTMENT PASSENGER VEHICLE
Filed March 23, 1953  7 Sheets-Sheet 6

INVENTOR.
Goodrich K. Murphy.
BY
Maurice A. Crews
ATTORNEY

Oct. 8, 1957  G. K. MURPHY  2,808,787
HIGH CAPACITY PRIVATE COMPARTMENT PASSENGER VEHICLE
Filed March 23, 1953  7 Sheets-Sheet 7

INVENTOR
Goodrich K. Murphy
BY
Maurice A. Crawl
ATTORNEY

United States Patent Office 2,808,787
Patented Oct. 8, 1957

2,808,787

HIGH CAPACITY PRIVATE COMPARTMENT PASSENGER VEHICLE

Goodrich K. Murphy, New Canaan, Conn., assignor to The Budd Company, Philadelphia, Pa., a corporation of Pennsylvania Application March 23, 1953, Serial No. 343,870

24 Claims. (Cl. 105—315)

This invention relates to high capacity private compartment passenger vehicles providing sitting, sleeping, and toilet facilities in each compartment, and has for an object the provision of improvements in this art. The present invention provides improvements upon the arrangement disclosed in the patent to Goodrich K. Murphy, No. 2,583,960, January 29, 1952.

In the patent referred to, compartments are arranged in horizontally staggered relation with alcoves, pockets or boot-like projections extending from one compartment into another to provide horizontal sleeping length space for each compartment within a total length which is considerably less than the product of the sleeping length multiplied by the total number of compartments. Stated another way, each compartment provides full sitting, standing and reclining space within a volumetric space which in part is less than standing height and which in part is less than reclining length. Considered in groups, a pair of compartments provides standing and reclining space in less than twice the unit standing and reclining length respectively. The unit of length for standing or reclining will be considered to be about 6 ft. or over. The width of the compartments is approximately double sitting width or about what is normally provided between the center aisle and the side aisle of standard passenger cars.

In the patent the compartments are all on one level but have portions which are staggered horizontally so that some passengers are seated on the window side and some on the aisle side; some of the toilets are on the window side and some on the aisle side; some of the beds when in the use position are on the window side and some on the aisle side; and the reclining space in part is narrower than the sitting space.

One of the objects of the present invention is to provide compartments of the same general size as those of the patented construction but in which all seats face in the same direction and all are located on the window side of the compartments.

Another object is to provide compartments in which beds can be made up partly within boots or recesses arranged in staggered relationship in a vertical plane or zone which extends longitudinally parallel with and adjacent to the outside wall, the alcoves and beds being of considerably less width than the total width of the compartment and the compartment providing a toilet, standing space and sitting space at the aisle side of the bed and also providing standing space in the vertical zone of the bed when the bed is stowed.

Another object is to provide compartments having bed boots arranged in staggered relationship in a vertical zone and being provided with full-length bedding accommodations which are formed in part of a fixed portion of the boot and in part of a movable portion which cooperates with the fixed portion in the boot to form the full-length bed.

Another object is to provide compartments, all of which have their toilet facilities—toilet, basin and mirror—on the aisle side where the plumbing is more protected and more accessible.

Another object is to provide compartments in which the beds in use position are all located on the window side, leaving free access to the aisle door without having to raise or climb over the bed.

Another object is to provide compartments in which the beds comprise separate hinged parts which swing down to conjointly form the bed.

Another object is to provide compartments in which there is standing room, with the aisle door closed, for operating the bed and for full use of the toilet facilities.

Another object is to provide free use of the toilet facilities at all times, whether the beds are stowed or in the use position.

Another object is to provide compartments having even-width reclining space for the full length of the space.

Another object is to provide clear space of ample height above the reclining space throughout its full length.

Another object is to provide window visibility to the outside from both the sitting and the reclining positions of all compartments.

Another object is to provide compartments of the character described, all of which have a floor level at least as high as the aisle level of the vehicle. There are no sunken floors.

Another object is to provide full-depth comfort mattresses for the full length of the reclining accommodations or beds.

As in the above-mentioned patent, the type of accommodation hereby provided compares favorably with the well-known roomette type of accommodation in which the space for the full horizontal area is of at least standing height and for approximately the full vertical height in a longitudinal direction is of at least reclining length; but whereas a standard railcar of 85 ft. length and about 8 ft. height from floor to roof at the outer walls and about 9¼ ft. width inside will accommodate only 20 to 22 passengers in roomettes, it will accommodate from 36 to 40 passengers in the present type of compartments.

The compartments are arranged on each side of a center aisle and are disposed between substantially plane longitudinal outer side walls and aisle walls. The compartments are separated by transverse walls which are jogged both vertically and transversely in an effective manner to provide alcoves, pockets, or boots for each compartment which project outwardly into adjacent compartments to provide the desired accommodations with the least possible sacrifice of comfort or appearance of the compartments.

The reclining accommodations or beds are provided by swingable mattress-carrying panels at each end of a compartment, the panels swinging out of vertical stowed position in pockets, alcoves, or boots into mutually co-planar horizontal use position above the seats to form together a full length bed. The back, arms and cushion of the seat of the lower compartment move down when the bed panel at the seat end is swung down, the seat being of a known type available on the market; and the panel for the head-end bed part of the upper compartment swings down at about seat back height, the back, if desired, swinging forward and being available for partial support of the panel.

The objects and various novel features of the invention will be apparent from the following description of certain exemplary embodiments, reference being made to the accompanying drawings thereof, wherein:

Fig. 1 is a sectional plan view, taken on the line 1—1 of Fig. 3, showing the upper compartments over a portion of the length of a vehicle, the lower half of the view showing the compartments arranged for sitting or daytime occupancy with the beds in stowed position, and the upper half showing the compartments arranged for reclining or night occupancy with the beds in horizontal use position;

Fig. 2 is a sectional plan view similar to Fig. 1 but taken on the line 2—2 of Fig. 3 to show the lower compartments;

Fig. 3 is a sectional elevation taken on a vertical plane intermediate the width of the compartments on the line 3—3 of Figs. 1 and 2, the accommodations being arranged for reclining occupancy;

Fig. 9 is a side elevation of a toilet, showing both the cover and seat in closed position;

Fig. 10 is a similar view showing the cover and seat raised and the splash guard raised with the seat;

Fig. 11 is a plan view with the seat and guard in lower position and the cover raised;

Fig. 12 is a partial vertical section taken on the line 12—12 of Fig. 1 to show a detail of the door and steps of the upper compartment;

Fig. 13 is a similar view taken on the line 13—13 of Fig. 1;

Figure 4:
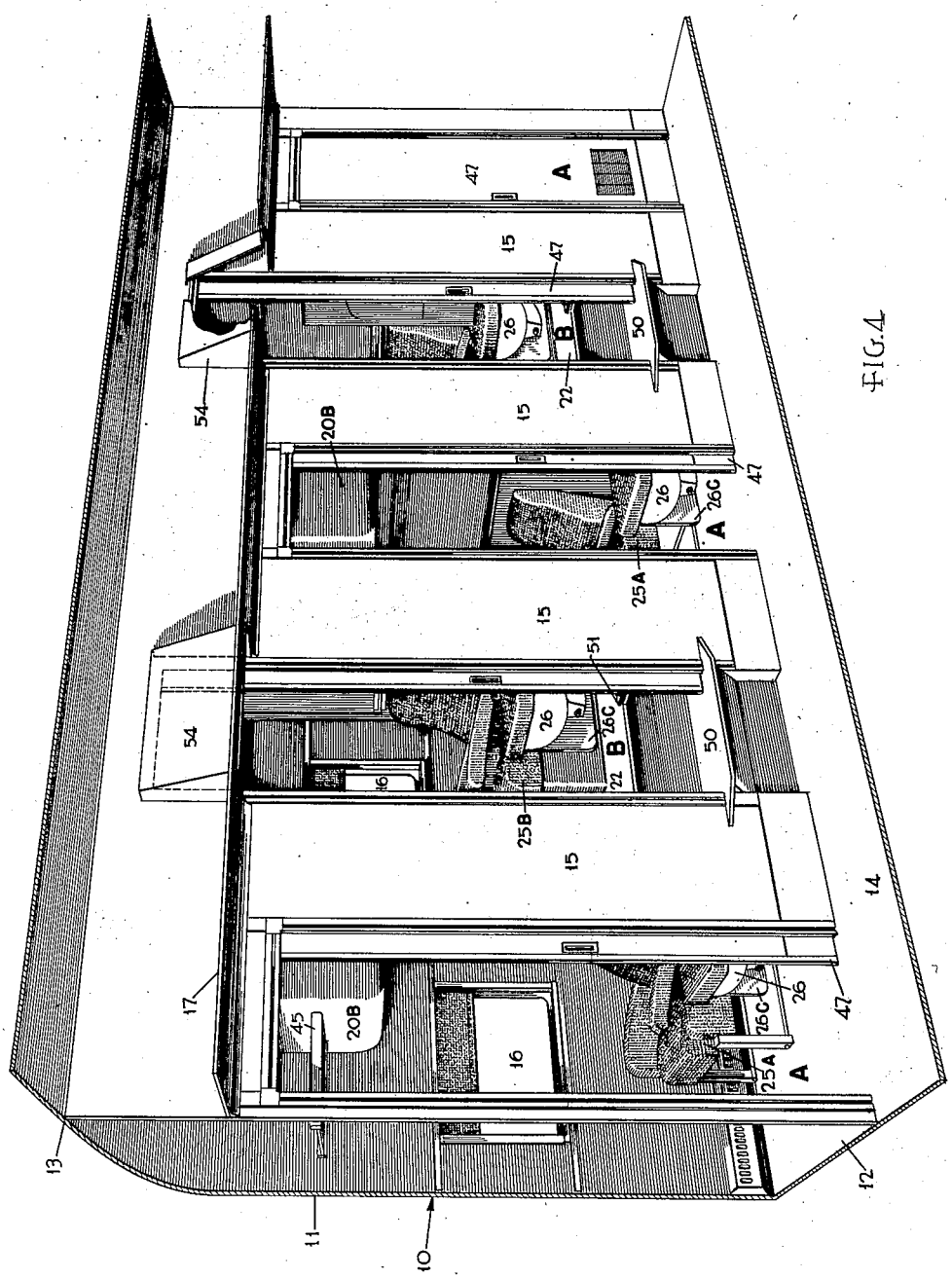
Fig. 4 is a perspective elevation of a group of compartments as viewed from the aisle with the compartment doors open and the compartments arranged for sitting occupancy, the direction of view being indicated by the arrow 4 in Figs. 1 and 2.

In the first embodiment, a railway car 10 having longitudinal outer side walls 11, a floor 12, a roof 13, a center aisle 14, aisle walls 15, windows 16, and an aisle ceiling 17, is provided on each side of the aisle with a number of compartments defined by tranverse partition walls 20 and 21.

The compartments are arranged in complemental pairs, including a lower compartment A with its floor at aisle level and an upper compartment B with its floor 22 at a higher level.

In each lower compartment or room A there is a seat 25A, a toilet 26, a folding wash basin 27, a wall mirror 28, and a bed 30A. The bed comprises a head end folding frame panel 30A1, a foot end folding frame panel 30A2, and a mattress 33A comprising an upper part 33A1 carried by the head panel 30A1 and a lower part 33A2 carried by the foot end panel 30A2.

Similarly, in each upper compartment B there is a seat 25B, a toilet 26, a folding wash basin 27, a wall mirror 28, and a bed 30B, the bed comprising a head end folding frame panel 30B1, a foot end folding frame panel 30B2, an upper mattress part 33B1, and a lower mattress part 33B2.

The main part of each transverse wall 20 or 21 may be considered to be that part which lies in a plane aligned with the back of a seat. The main part of the partition wall 20 will be taken as that which is behind the back 25A1 of the seat of a lower compartment A and the main part of the partition wall 21 will be taken as that which is behind the back 25B1 of the seat of an upper compartment B.

Figure 7:
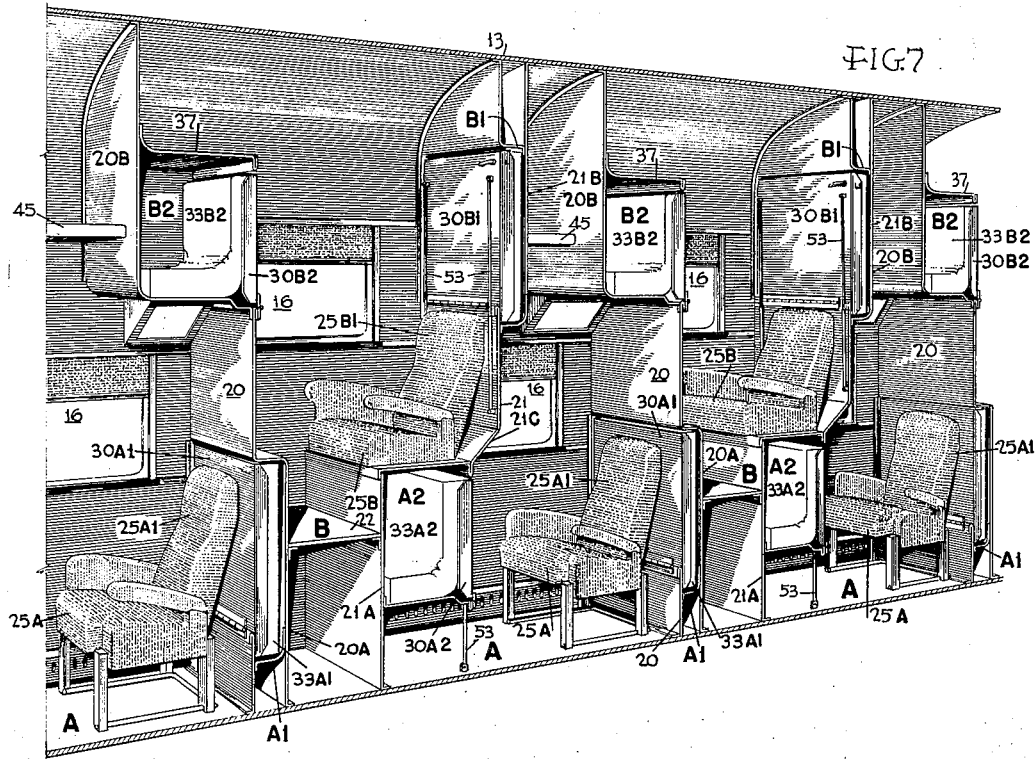
Fig. 7 is a perspective sectional elevation taken on the same plane as Fig. 3 with the direction indicated by the arrow 7 in Figs. 1 and 2, the compartments being arranged for sitting occupancy.

The partition wall 20 has a rearwardly offset portion 20A forming with longitudinal side walls, a rearward recess, pocket, or alcove A1 to receive the head end mattress 33A1 of the lower compartment A. When the head end panel 30A1 of the bed of the lower compartment is in vertical stowed position, as shown in Fig. 7, it is aligned with the main portion of the transverse wall 20.

Above the seat 25A of the lower compartment the wall 20 has a forwardly offset portion 20B forming, with longitudinal side walls, a forward recess, pocket, or alcove B2 to receive the foot end mattress 33B2 of the aft upper compartment B. When the foot end panel 30B2 of the upper compartment is in vertical stowed position, as shown in Fig. 7, it is aligned with the main portion of the transverse wall 20.

The offset portion 20B extends to the roof and the upper horizontal longitudinal wall of the mattress pocket B2 forms a shelf 37 for luggage for compartment B.

Figure 5:
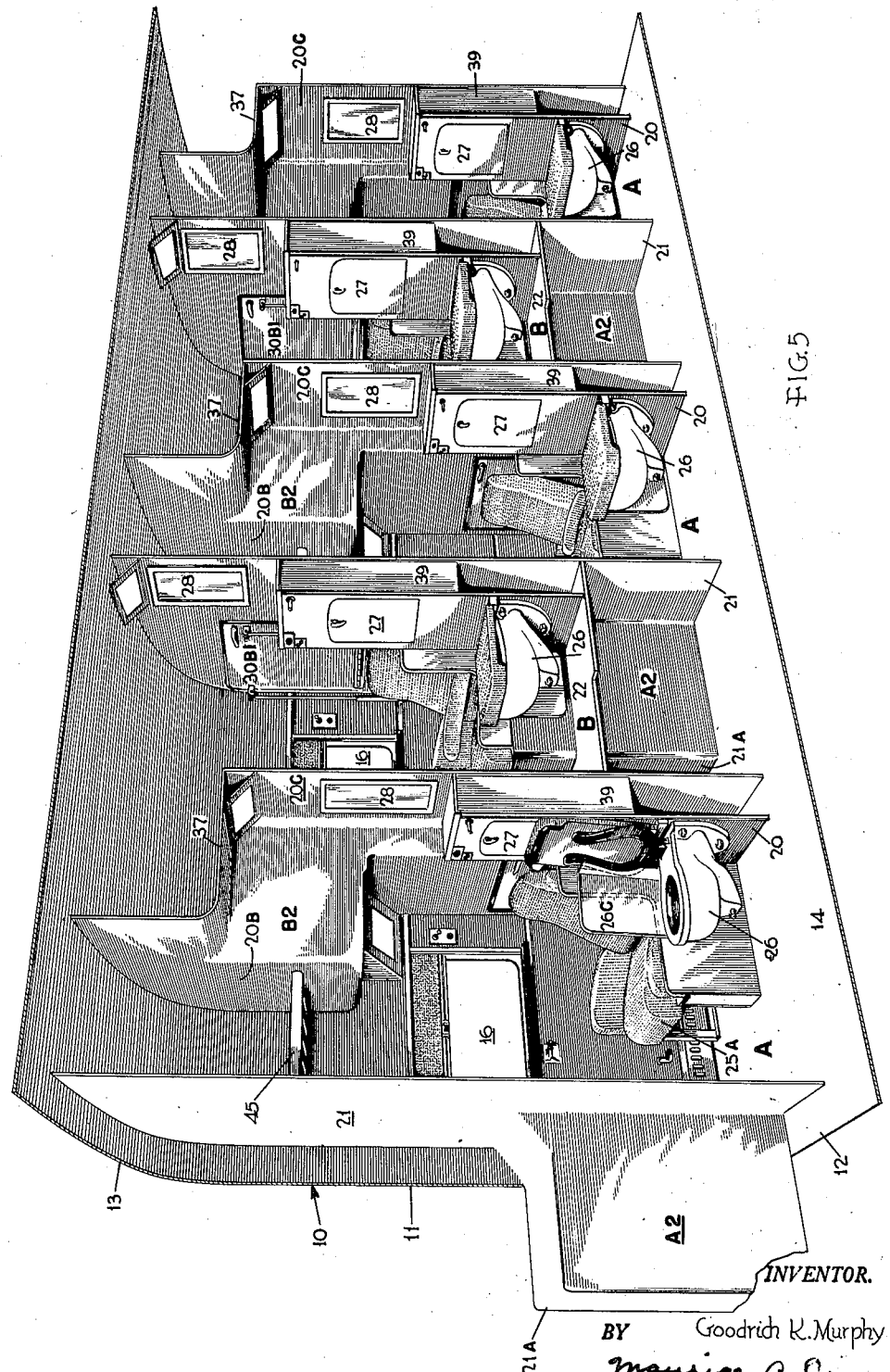
Fig. 5 is a perspective sectional elevation of the same group of compartments with the aisle wall removed, the direction of view being indicated by the arrow 5 in Figs. 1 and 2.
Figure 6:
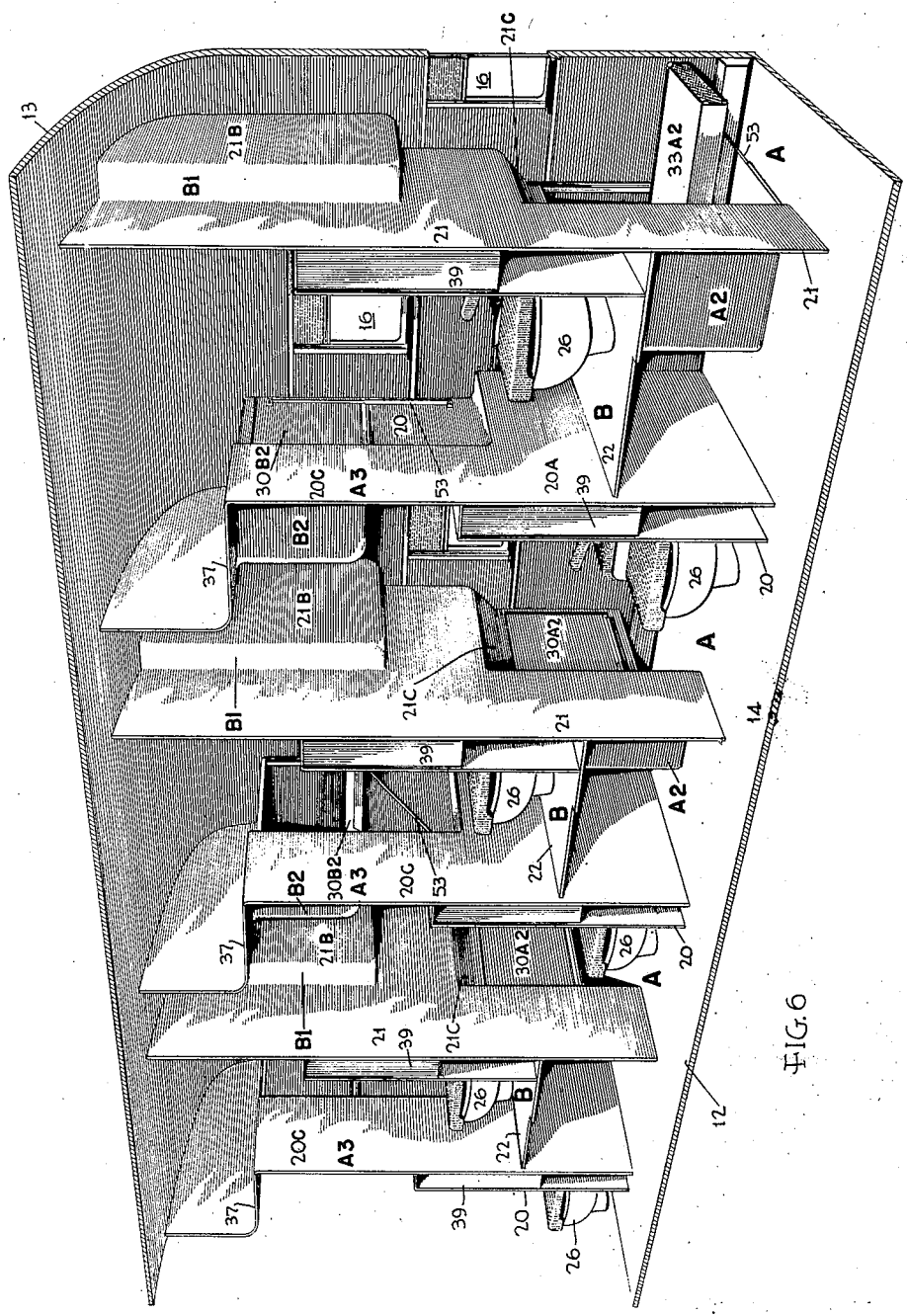
Fig. 6 is a perspective elevation like Fig. 5 but directed toward the other end of the compartments, the direction being indicated by the arrow 6 in Figs. 1 and 2.

The rearwardly offset portion 20A extends down to the floor 14 for the full width of the compartment and, on the inboard or aisle side of the pocket A1 an offset portion 20C extends from the floor 14 to the shelf or luggage rack 37, to form, with side walls, an alcove A3 for the cabinet 39 of the basin 27 and a support for the mirror 28, as shown in Fig. 5. As shown in Fig. 6, the offset portions 20A and 20C are coplanar in the lower part of their length.

The partition wall 21 has a rearwardly offset portion 21B forming, with longitudinal side walls, a rearward recess, pocket, or alcove B1 to receive the head end mattress 33B1 of the upper compartment B. When the head end panel 30B1 of the bed of the upper compartment is in vertical stowed position, as shown in Fig. 7, it is aligned with the main portion of the transverse wall 21.

Below the seat 25B of the upper compartment the wall 21 has a forwardly offset portion 21A forming, with longitudinal side walls, a forward recess, pocket, or alcove A2 to receive the foot end mattress 33A2 of the aft lower compartment A. When the foot end panel 30A2 of the lower compartment is in vertical stowed position, as shown in Fig. 7, it is aligned with a depending edge 40 which is provided at the forward edge of a sloping panel 21C extending forward and downward from the main portion of the wall 21.

The offset portion 21A extends down to the floor and intermediate its height carries an edge of the lower horizontal longitudinal pocket bottom, floor, or shelf 42 which forms the bottom of the alcove A2 to which the bed panel 30A2 is hinged.

On the side toward the aisle the main portion of the transverse wall 21 extends upward to the roof and downward to the floor, as shown in Fig. 5. The basin cabinet 39 of the upper compartment is backed by this aisle-side portion of the wall 21.

The lower compartment A is provided above the window 16 with a baggage rack 45.

Each compartment is provided with an aisle doorway 46 closed by a sliding door 47.

Steps 50, here including two risers and one tread, are provided at the door of the upper compartment B. There is a small gap in the floor 22 at the door and the door of the upper compartment carries a metal plate 51 to close this gap when the door is closed. A plate 22A on the floor covers and protects plate 51 when the door is open.

Figure 8:
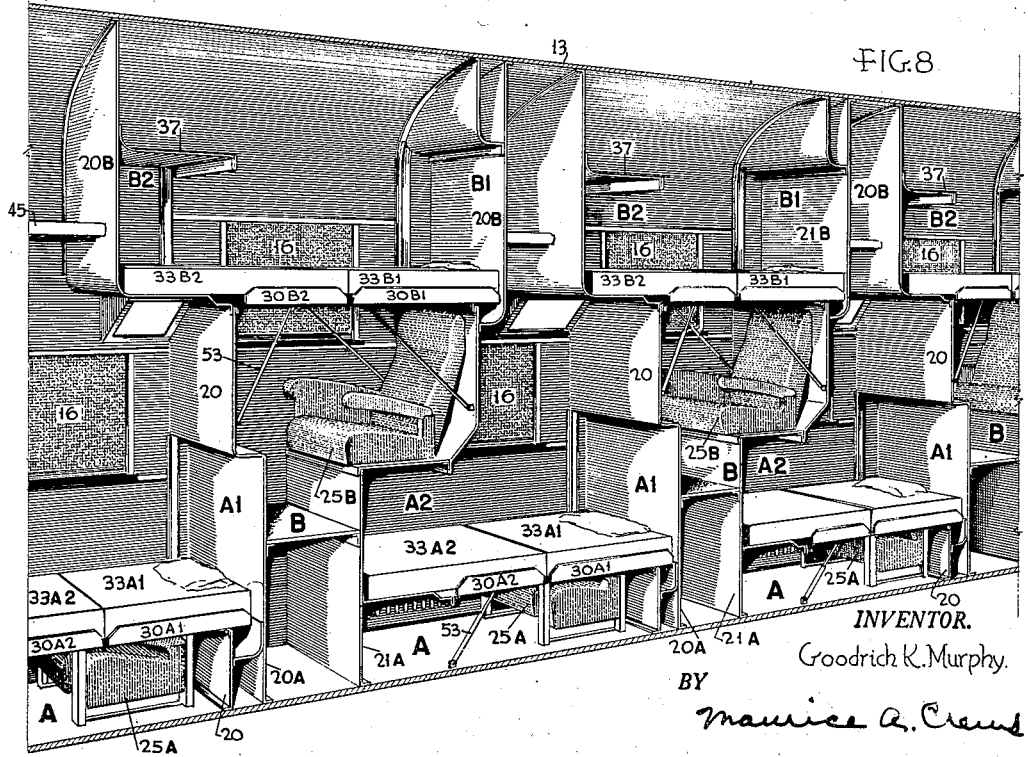
Fig. 8 is a perspective sectional elevation similar to Fig. 7 but with the compartments arranged for reclining occupancy, the direction being indicated by the arrow 8 in Figs. 1 and 2.

Means are provided for supporting the outer ends of the bed panels when in the horizontal use position. As shown in Fig. 3, the head-end panel 30A1 of the bed of the lower compartment A is supported on the frame of the seat 25A, the back, arms and seat cushion moving down below the bed panel. The foot-end panel 30A2 is supported partly on a bracket 52 at the side wall and partly by a leg 53 (Fig. 8). The bed panels of the upper compartment B are both supported by legs 53. The legs 53 are made as telescopic units hinged at one end to the bed panel and at the other end to the floor (lower) or to a partition wall (upper). They extend vertically when the bed panels are folded up and extend at an angle when the panels are down in the use position. Stop elements are provided between the telescopic elements to provide support in the angled position of use.

Head clearance recesses 54 are provided at the doorways 46 of the upper compartments, the aisle ceiling 17 being cut back as required for this purpose.

Figure 14:
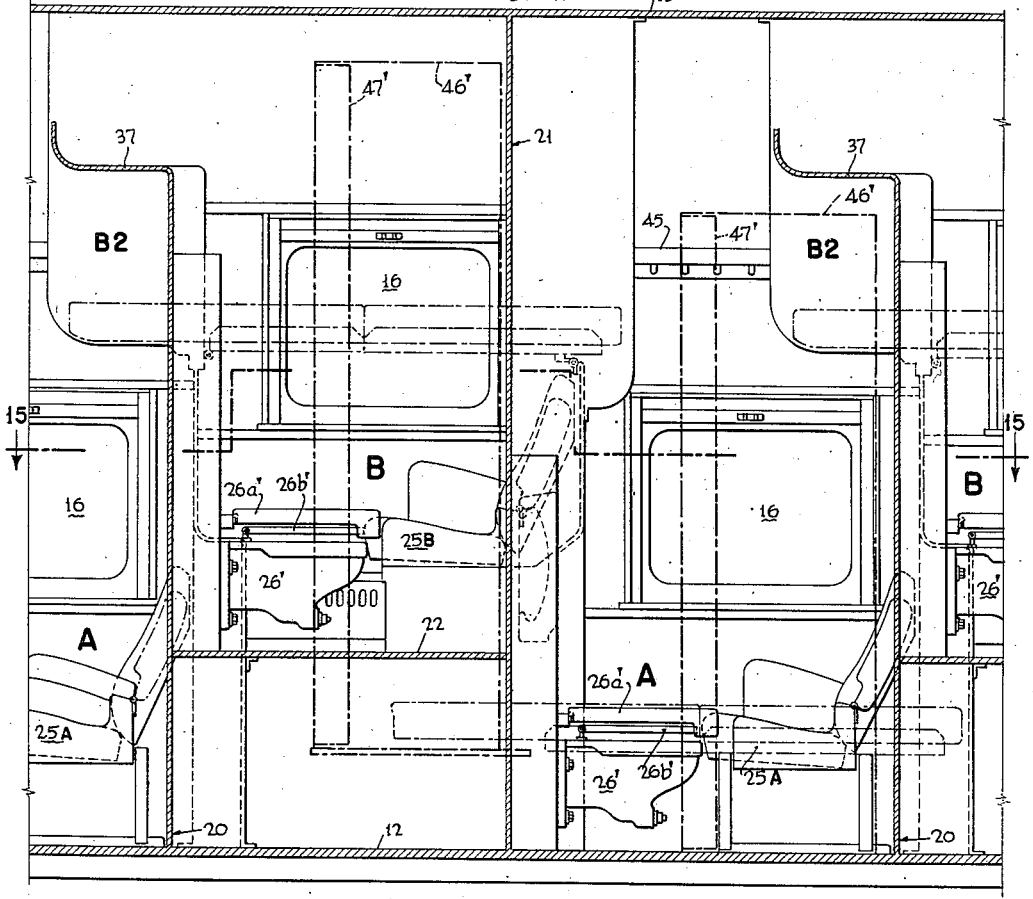
Fig. 14 is a sectional elevation of a modification, the section being indicated by the line 14—14 on Fig. 15.
Figure 15:
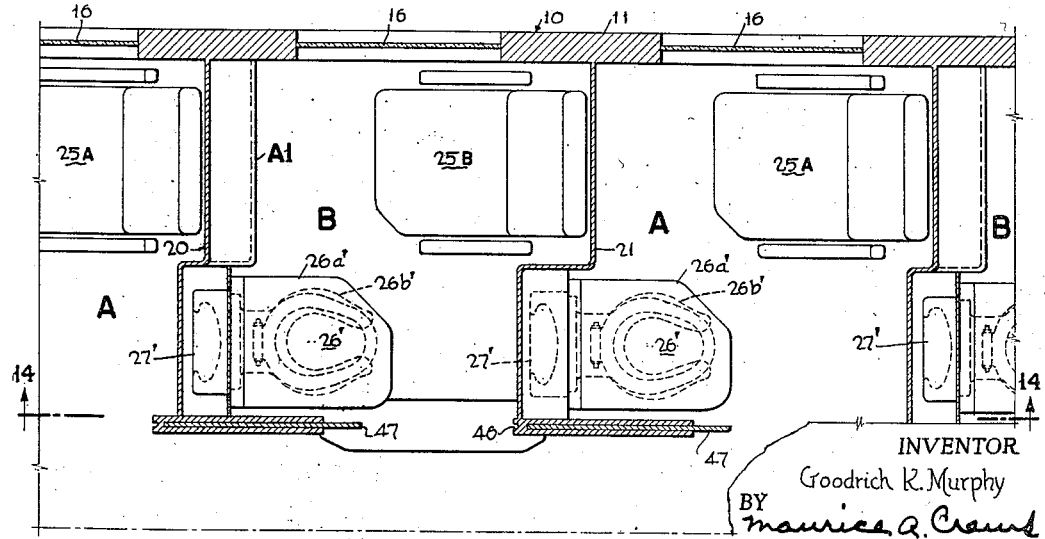
Fig. 15 is a sectional plan view taken on the line 15—15 of Fig. 14.

The modification shown in Figs. 14 and 15 is, in all general arrangement, the same as the first modification, and the same numbers are used for the same parts, a prime (') being added where parts are modified or changed in location. In the modification the toilets 26' are located diagonally opposite the seats instead of being located alongside the seats and the door openings 46' and doors 47' are changed in location to provide access past the front of the toilets. The splash guards are not needed for the seats when the toilets are shifted to the opposite wall but they may be retained if desired, on one or both sides of the toilet seat, to make a more sanitary arrangement. The change of toilet location entails some change in the shape of the partition walls but this is small and is obvious from the views showing the modification.

It is thus seen that the invention provides high capacity private accommodations in a car yet preserves most of the desirable features of more expensive accommodations. There is some apparent disadvantage in using two-part mattresses instead of a single mattress on a single rigid frame. Beds have to be made up after being pulled down instead of being ready-made, but they are easier to move up and down and have greater availability for convenient lounging purposes when bed covers are not needed. The mattresses are preferably made of sponge rubber and push together to completely fill the gap and form a smooth surface when the beds are down.

In the case of the lower compartments A, the foot end of the bed may be pulled down without disturbing the seat and since it is about at the height of the seat it makes a good leg rest. The corresponding sections of mattresses for upper and lower compartments are alike, making for standardization.

The upper and lower compartments both have the major desirable features which make for basic comfort and satisfaction. They are not alike in all features, the lowers having certain distinctive features, especially ample leg room and leg rest facilities, which appeal to some occupants and the uppers having wider head room, more bag space, more quietness and the like which appeal to other occupants.

All compartments are light, open, accessible in all parts and in general have smooth surfaces which are of good appearance and easy to keep clean.

While certain embodiments of the invention have been described for purposes of illustration, it is to be understood that there may be various modifications within the general scope of the invention.

What is claimed is:

1. In a passenger-carrying vehicle, in combination, a longitudinally extending outer side wall, a longitudinally extending aisle wall, and a plurality of longitudinally spaced transverse partition walls dividing the space between said side wall and said aisle wall into a plurality of occupancy compartments of approximately double sitting width each providing sitting and horizontal reclining accommodations for an occupant therein, each of a plurality of adjacent partition walls including longitudinally offset portions at different levels forming, together with surrounding longitudinal walls, oppositely extending alcoves at different levels, each alcove of a partition wall mating with an opposed alcove of the same level of an adjacent partition wall to form mating paired alcoves providing portions of a bed space, and bed frame panels hingedly mounted in at least one of each mating pair of said alcoves so as to swing between a generally vertical stowed position and a horizontal use position lengthwise of the vehicle and providing, with means in the other mating alcove, beds at different levels between paired alcoves, the beds and alcoves being considerably narrower than the compartments to provide standing space of sitting width alongside the beds in the compartments.

2. In a passenger-carrying vehicle, in combination, a longitudinally extending outer side wall, a longitudinally extending aisle wall, a plurality of longitudinally spaced transverse partition walls dividing the space between said side wall and said aisle wall into a plurality of occupancy compartments of approximately double sitting width, floors for adjacent compartments respectivley at a different level for each of the adjacent compartments, each of a plurality of adjacent partition walls including longitudinally offset portions at different levels forming, together with surrounding longitudinal walls, oppositely extending alcoves at different levels, each alcove of a partition wall mating with an opposed alcove of the same level of an adjacent partition wall to form mating paired alcoves providing portions of a bed space, and bed frame panels hingedly mounted in at least one of each mating pair of said alcoves so as to swing between a generally vertical stowed position and a horizontal use position lengthwise of the vehicle and providing, with means in the other mating alcove, beds at different levels between paired alcoves.

3. In a passenger-carrying vehicle, in combination, a longitudinally extending outer side wall, a longitudinally extending aisle wall, a plurality of longitudinally spaced transverse partition walls dividing the space between said side and aisle walls into a plurality of separate occupancy compartments of approximately double sitting width, floors for adjacent compartments respectively at a different level for each of the adjacent compartments, the opposite partition walls of each compartment having outwardly extending alcoves aligned with each other, and a bed panel hinged in each alcove to swing from a vertical stowed position to a horizontal use position, the bed panels meeting and aligning with each other when down in the use position and providing with the alcoves at the ends a full-length bed for the occupant, the beds of adjacent compartments being located in the same vertical longitudinal zone.

4. In a passenger-carrying vehicle, in combination, a longitudinally extending outer side wall, a longitudinally extending aisle wall, a plurality of longitudinally spaced transverse partition walls dividing the space between said side and aisle walls into a plurality of separate occupancy compartments of approximately double sitting width, floors for adjacent compartments respectively at a different level for each of the adjacent compartments, the opposite partition walls of each compartment having outwardly extending alcoves aligned with each other, and a bed panel hinged in each alcove to swing from a vertical stowed position to a horizontal use position, the bed panels meeting and aligning with each other when down in the use position and providing with the alcoves at the end a full-length bed for the occupant, said alcoves and bed panels being located adjacent the outer wall and being narrower than the compartment to provide standing space of sitting width alongside the bed within the compartment adjacent the aisle wall.

5. In a passenger-carrying vehicle, in combination, a longitudinally extending outer side wall, a longitudinally extending aisle wall, a plurality of longitudinally spaced transverse partition walls dividing the space between said side and aisle walls into a plurality of separate occupancy compartments of approximately double sitting width, floors for adjacent compartments respectively at a different level for each of the adjacent compartments, the opposite partition walls of each compartment having outwardly extending alcoves aligned with each other, a bed panel hinged in each alcove to swing from a vertical stowed position to a horizontal use position, the bed panels meeting and aligning with each other when down in the use position and providing with the alcoves at the end a full-length bed for the occupant, said alcoves of adjacent compartments being located at different levels to place the beds at different levels, and a window in each compartment located at least in part above the bed when down in the use position, the beds all being located on the side adjacent a window.

6. In a passenger-carrying vehicle, in combination, a longitudinally extending outer side wall, a longitudinally extending aisle wall, a plurality of longitudinally spaced transverse partition walls dividing the space between said side and aisle walls into a plurality of separate occupancy compartments of approximately double sitting width, floors for adjacent compartments respectively at a different level for each of the adjacent compartments, the opposite partition walls of each compartment having outwardly extending alcoves aligned with each other, a bed panel hinged in each alcove to swing from a vertical stowed position to a horizontal use position, the bed panels meeting and aligning with each other when down in the use position and providing with the alcoves at the end a full-length bed for the occupant, said alcoves and bed panels for all compartments being located adjacent the outer wall and being narrower than the compartment to provide standing space of sitting width alongside thereof within the compartment adjacent the aisle wall, the alcoves of adjacent compartments being located at different levels to place the beds at different levels, and a seat in each compartment located on the outer side, the seats of all compartments facing in the same direction.

7. In a passenger-carrying vehicle, in combination, a longitudinally extending outer side wall, a longitudinally extending aisle wall, a plurality of longitudinally spaced transverse partition walls dividing the space between said side and aisle walls into a plurality of separate occupancy compartments of approximately double sitting width, floors for adjacent compartments respectively, at a different level for each of the adjacent compartments to form lower and upper compartments, the opposite partition walls of each compartment having outwardly extending alcoves aligned with each other, and a bed panel hinged in each alcove to swing from a vertical stowed position to a horizontal use position, the bed panels meeting and aligning with each other when down in the use position and providing with the alcoves at the end a full-length bed for the occupant, the alcoves of one compartment protruding into an adjacent compartment or space, the adjacent alcoves protruding into the upper part of a lower compartment being spaced apart sufficiently to provide head room between them, and the adjacent alcoves protruding into the lower part of the upper compartment being spaced apart sufficiently to provide standing room between them.

8. In a passenger-carrying vehicle having spaced longitudinal side walls, a floor, a center aisle, and longitudinal aisle walls, in combination, a plurality of longitudinally spaced transverse partition walls dividing the space between side and aisle walls into a plurality of separate enclosed occupancy compartments of approximately double sitting width, said compartments in alternation having floors at aisle level and a higher-than-aisle level, a backed-seat in each compartment adjacent the outer wall, seats in all compartments on each side of the vehicle facing in the same direction, a window in each compartment alongside and forward of the back of the seat therein, an aisle door for each compartment, a toilet in each compartment adjacent the aisle wall, the seat and toilet together being embraced within the width of the compartment, an alcove behind each seat back, an aligned alcove in the opposite wall in front of the seat, a bed panel hinged in each alcove, the bed panels moving from a vertical stowed position at the openings of the alcoves to a horizontal use position where they align and meet to form a full-length bed for an occupant, the bed of the lower compartment being located about at sitting height above the floor and the bed of the upper compartment being located at sitting height or more above the top of the toilet in the compartment and within easy access from a standing position on the toilet.

9. In a passenger-carrying vehicle having spaced longitudinal side walls, a floor, a center aisle, and longitudinal aisle walls, in combination, a plurality of longitudinally spaced transverse partition walls dividing the space between side and aisle walls into a plurality of separate enclosed occupancy compartments of approximately double sitting width, said compartments in alternation having floors at aisle level and a higher-than-aisle level, a backed-seat in each compartment adjacent the outer wall, seats in all compartments on each side of the vehicle facing in the same direction, a window in each compartment alongside and forward of the back of the seat therein and at eye level to an occupant sitting in the seat, an aisle door for each compartment, a toilet in each compartment adjacent the aisle wall, the seat and toilet together being embraced within the width of the compartment, an alcove behind each seat back, an aligned alcove in the opposite wall in front of the seat, a bed panel hinged in each alcove, the bed panels moving from a vertical stowed position at the openings of the alcoves to a horizontal use position where they align and meet to form a full-length bed for an occupant, the bed of the lower compartment being located about at sitting height above the floor and the bed of the upper compartment being located at sitting height or more above the top of the toilet in the compartment and within easy access from a standing position on the toilet, the alcove in front of the seat of the lower compartment protruding beneath the seat cushion of an upper compartment, and the alcove in front of the seat of the upper compartment protruding at a height above the seat back and window of a lower compartment.

10. In a passenger-carrying vehicle having spaced longitudinal side walls, a floor, a center aisle, and longitudinal aisle walls, in combination, a plurality of longitudinally spaced transverse partition walls dividing the space between side and aisle walls into a plurality of separate enclosed occupancy compartments of approximately double sitting width, said compartments in alternation having floors at aisle level and a higher-than-aisle level, a backed-seat in each compartment adjacent the outer wall, seats in all compartments on each side of the vehicle facing in the same direction, a window in each compartment alongside and forward of the back of the seat therein and at eye level to an occupant sitting in the seat, an aisle door for each compartment, a toilet in each compartment adjacent the aisle wall, the seat and toilet together being embraced within the width of the compartment, an alcove behind each seat back, an aligned alcove in the opposite wall in front of the seat, a bed panel hinged in each alcove, the bed panels moving from a vertical stowed position at the openings of the alcoves to a horizontal use position where they align and meet to form a full-length bed for an occupant, the bed of the lower compartment being located about at sitting height above the floor and the bed of the upper compartment being located at sitting height or more above the top of the toilet in the compartment and within easy access from a standing position on the toilet, the toilet being located alongside the seat in each compartment.

11. In a passenger-carrying vehicle having spaced longitudinal side walls, a floor, a center aisle, and longitudinal aisle walls, in combination, a plurality of longitudinally spaced transverse partition walls dividing the space between side and aisle walls into a plurality of separate enclosed occupancy compartments of approximately double sitting width, said compartments in alternation having floors at aisle level and a higher-than-aisle level, a backed-seat in each compartment adjacent the outer wall, seats in all compartments on each side of the vehicle facing in the same direction, a window in each compartment alongside and forward of the back of the seat therein and at eye level to an occupant sitting in the seat, an aisle door for each compartment, a toilet in each compartment adjacent the aisle wall, the seat and toilet together being embraced within the width of the compartment, an alcove behind each seat back, an aligned alcove in the opposite wall in front of the seat, a bed panel hinged in each alcove, the bed panels moving from a vertical stowed position at the openings of the alcoves to a horizontal use position where they align and meet to form a full-length bed for an occupant, the bed of the lower compartment being located about at sitting height above the floor and the bed of the upper compartment being located at sitting height or more above the top of the toilet in the compartment and within easy access from a standing position on the toilet, the toilet being located alongside the seat in each compartment, and a splash guard located between the toilet and seat.

12. In a passenger-carrying vehicle having spaced longitudinal side walls, a floor, a center aisle, and longitudinal aisle walls, in combination, a plurality of longitudinally spaced transverse partition walls dividing the space between side and aisle walls into a plurality of separate enclosed occupancy compartments of approximately double sitting width, said compartments in alternation having floors at aisle level and a higher-than-aisle level, a backed-seat in each compartment adjacent the outer wall, seats in all compartments on each side of the vehicle facing in the same direction, a window in each compartment alongside and forward of the back of the seat therein and at eye level to an occupant sitting in the seat, an aisle door for each compartment, a toilet in each compartment adjacent the aisle wall, the seat and toilet together being embraced within the width of the compartment, an alcove behind each seat back, an aligned alcove in the opposite wall in front of the seat, a bed panel hinged in each alcove, the bed panels moving from a vertical stowed position at the openings of the alcoves to a horizontal use position where they align and meet to form a full-length bed for an occupant, the bed of the lower compartment being located about at sitting height above the floor and the bed of the upper compartment being located at sitting height or more above the top of the toilet in the compartment and within easy access from a standing position on the toilet, the toilet being located alongside the seat in each compartment, and a splash guard secured on a part hinged on the toilet, the splash guard being located between the seat and toilet and occupying an elevated position above the toilet when the hinged part is raised.

13. In a passenger-carrying vehicle having spaced longitudinal side walls, a center aisle, and longitudinal aisle walls, in combination, a plurality of longitudinally spaced transverse partition walls dividing the space between side and aisle walls into a plurlaity of separate enclosed occupancy compartments of approximately double sitting width, a seat in each compartment, a bed in each compartment which in the use position is located above the seat, a toilet alongside the seat and bed, and a splash guard located between the toilet on the one side and the seat and bed on the other side, said splash guard being of such size and so arranged as to form full separation for a considerable height above the toilet on the seat side when the toilet is fully uncovered, the toilet otherwise being unobstructed.

14. In a passenger-carrying vehicle having spaced longitudinal side walls, a center aisle, and longitudinal aisle walls, in combination, a plurality of longitudinally spaced transverse partition walls dividing the space between side and aisle walls into a plurality of separate enclosed occupancy compartments of approximately double sitting width, a seat in each compartment, a bed in each compartment which in the use position is located above the seat, a toilet alongside the seat and bed, and a splash guard located between the toilet on the one side and the seat and bed on the other side, said splash guard being secured to the toilet seat and raised into use position above the toilet when the toilet seat is raised, said splash guard being of such size as to form full separation for a considerable height above the toilet on the seat side when the toilet is fully uncovered, the toilet otherwise being unobstructed.

15. In a passenger-carrying vehicle having spaced longitudinal side walls, a floor, a center aisle, and longitudinal aisle walls, in combination, a plurality of longitudinally spaced transverse partition walls dividing the space between side and aisle walls into a plurality of separate enclosed occupancy compartments of approximately double sitting width, said compartments in alternation having floors at aisle level and a higher-than-aisle level, a backed-seat in each compartment adjacent the outer wall, seats in all compartments on each side of the vehicle facing in the same direction, a window in each compartment alongside and forward of the back of the seat therein, an aisle door for each compartment, a toilet in each compartment adjacent the aisle wall, the seat and toilet together being embraced within the width of the compartment, an alcove behind each seat back, an aligned alcove in the opposite wall in front of the seat, a bed panel hinged in each alcove, the bed panels moving from a vertical stowed position at the openings of the alcoves to a horizontal use position where they align and meet to form a full-length bed for an occupant, the bed of the lower compartment being located about at sitting height above the floor and the bed of the upper compartment being located at sitting height or more above the top of the toilet in the compartment, the toilet being located diagonally opposite the seat in each compartment.

16. In a passenger-carrying vehicle, in combination, a longitudinally extending outer side wall, a longitudinally extending aisle wall, and a plurality of longitudinally spaced transverse walls dividing the space between said side wall and said aisle wall into a plurality of occupancy compartments of approximately double sitting width, one of said compartments having an elevated floor at a level higher than the aisle floor level, steps leading from the aisle floor to the elevated compartment floor, the compartment floor having a cut-out recess at the steps, a door in the aisle wall, and a plate on said door closing said floor recess when the door is closed, the plate forming a continuation of the floor above the recess upon which an occupant may stand.

17. In a passenger-carrying vehicle, in combination, a longitudinally extending outer side wall, a longitudinally extending aisle wall, and a plurality of longitudinally spaced transverse walls dividing the space between said side wall and said aisle wall into a plurality of occupancy compartments of approximately double sitting width, one of said compartments having an elevated floor at a level higher than the aisle floor level, steps leading from the aisle floor to the elevated compartment floor, the compartment floor having a cut-out recess at the steps, a sliding door in the aisle wall, a horizontal plate on said door closing said floor step recess when the door is closed to form a useable floor extension above said recess, and a plate secured to the compartment floor at one end of said recess which stands above and protects the plate on said door when the door is open.

18. In a passenger-carrying vehicle, in combination, a longitudinally extending outer side wall, a longitudinally extending aisle wall, a plurality of longitudinally spaced transverse partition walls dividing the space between said side wall and said aisle wall into a plurality of occupancy compartments of approximately double sitting width, each compartment having a seat, full-length bed accommodations, and a toilet alongside the bed space on the aisle side, which is accessible for use at all times, each compartment being of sitting length with knee and foot space throughout its width at the seat, protruding alcoves or boots in each of a plurality of adjacent partition walls in vertical zones at the outer wall providing, at companion facing alcoves, full-length bed spaces of approximately single sitting width, and movable means in each compartment forming with bed means, in at least one of each companion pair of bed alcoves, a full-length bed.

19. In a passenger-carrying vehicle, in combination, a longitudinally extending outer side wall, a longitudinally extending aisle wall, a plurality of longitudinally spaced transverse partition walls dividing the space between said side wall and said aisle wall into a plurality of occupancy compartments of approximately double sitting width, each compartment having a seat, full-length bed accommodations, and a toilet alongside the bed space on the aisle side, which is accessible for use at all times, each compartment being of sitting length with knee and foot space throughout its width at the seat, protruding alcoves or boots in each of a plurality of adjacent partition walls in vertical zones at the outer wall providing, at companion facing alcoves, full-length bed spaces of approximately single sitting width, and movable means in each compartment forming with bed means, in at least one of each companion pair of bed alcoves, a full-length bed, the seats of all compartments being located at the outer wall in the vertical zone of the alcoves and beds.

20. In a passenger-carrying vehicle, in combination, a longitudinally extending outer side wall, a longitudinally extending aisle wall, a plurality of longitudinally spaced transverse partition walls dividing the space between said side wall and said aisle wall into a plurality of occupancy compartments of approximately double sitting width, each compartment having a seat, full-length bed accommodations, and a toilet alongside the bed space on the aisle side, which is accessible for use at all times, each compartment being of sitting length with knee and foot space throughout its width at the seat, protruding alcoves or boots in each of a plurality of adjacent partition walls in vertical zones at the outer wall providing, at companion facing alcoves, full-length bed spaces of approximately single sitting width, and movable means in each compartment forming with bed means, in at least one of each companion pair of bed alcoves, a full-length bed, the seats of all compartments being located at the outer wall in the vertical zone of the alcoves and beds, and a seat in each of all the compartments facing in the same direction.

21. In a passenger-carrying vehicle, in combination, a longitudinally extending outer side wall, a longitudinally extending aisle wall, a plurality of longitudinally spaced transverse partition walls dividing the space between said side wall and said aisle wall into a plurality of occupancy compartments each providing sitting and standing accommodations and full-length longitudinal bed accommodations, each compartment being of approximately double sitting width with bed and seat accommodations located at the outer side wall and leaving standing and sitting space between the bed space and the aisle wall, a toilet in the space adjacent the aisle wall in each compartment which is clear of the bed zone, the compartments being arranged in groups of at least two compartments in each group adapted for repetition of groups along the length of the vehicle, at least one of the compartments having a floor at a level above the floor level of an adjacent compartment, bed accommodations in each compartment formed, at a common bed level, by multi-part bed elements, at least one part of which is foldable, and at least part of which is disposed within an alcove which extends as a boot into an adjacent compartment within the standing height in the compartment, each of a plurality of adjacent partition walls having longitudinally offset portions forming a bed alcove.

22. In a passenger-carrying vehicle, in combination, a longitudinally extending outer side wall, a longitudinally extending aisle wall, a plurality of longitudinally spaced transverse partition walls dividing the space between said side wall and said aisle wall into a plurality of occupancy compartments each providing sitting and standing accommodations and full-length longitudinal bed accommodations, each compartment being of approximately double sitting width with bed and seat accommodations located at the outer side wall and leaving standing and sitting space between the bed space and the aisle wall, a toilet in the space adjacent the aisle wall in each room which is clear of the bed zone, the compartments being arranged in groups of at least two compartments in each group adapted for repetition of groups along the length of the vehicle, at least one of the compartments having a floor at a level above the floor level of an adjacent compartment, bed accommodations in each compartment formed, at a common bed level, by multi-part bed elements, at least one part of which is foldable, and at least part of which is disposed within an alcove which extends as a boot into an adjacent compartment within the standing height in the compartment, each of a plurality of adjacent partition walls having longitudinally offset portions forming a bed alcove, the head part of a bed accommodation for a compartment being foldable to stowed position and the foot part being located in an alcove.

23. In a passenger-carrying vehicle, in combination, a longitudinally extending outer side wall, a longitudinally extending aisle wall, a plurality of longitudinally spaced transverse partition walls dividing the space between said side wall and said aisle wall into a plurality of occupancy compartments each providing sitting and standing accommodations and full-length longitudinal bed accommodations, each compartment being of approximately double sitting width with bed and seat accommodations located at the outer side wall and leaving standing and sitting space between the bed space and the aisle wall, a toilet in the space adjacent the aisle wall in each room which is clear of the bed zone, the compartments being arranged in groups of at least two compartments in each group adapted for repetition of groups along the length of the vehicle, at least one of the compartments having a floor at a level above the floor level of an adjacent compartment, bed accommodations in each compartment formed, at a common bed level, by multi-part bed elements, at least one part of which is foldable, and at least part of which is disposed within an alcove which extends as a boot into an adjacent compartment within the standing height in the compartment, each of a plurality of adjacent partition walls having longitudinally offset portions forming a bed alcove, the toilet of a compartment being located diagonally opposite an outer wall seat of the compartment.

24. In a passenger-carrying vehicle, in combination, a longitudinally extending outer side wall, a longitudinally extending aisle wall, a plurality of longitudinally spaced transverse partition walls dividing the space between said side wall and said aisle wall into a plurality of separate occupancy compartments each providing sitting and standing accommodations, each compartment being of approximately double sitting width with bed and seat accommodations located at the outer side wall and leaving standing and sitting space between the bed space and the aisle wall, a toilet in the space adjacent the aisle wall in each room which is clear of the bed zone, the compartments being arranged in groups of at least two compartments in each group adapted for repetition of groups along the length of the vehicle, at least one of the compartments having a floor at a level above the floor level of an adjacent compartment, a plurality of adjacent transverse walls each having offset portions at different heights forming bed alcoves, all of said compartments having seats facing in the same longitudinal direction, bed accommodations in each compartment formed, at a common bed level, by multi-part beds, at least one part of which is foldable about a horizontal transverse axis to enclose bedding in an alcove in front of a seat in the compartment.

References Cited in the file of this patent

UNITED STATES PATENTS

| | | |
|---|---|---|
| 2,364,094 | Parke et al. | Dec. 5, 1944 |
| 2,536,194 | Loewy | Jan. 2, 1951 |
| 2,561,630 | Murphy et al. | July 24, 1951 |
| 2,583,960 | Murphy | Jan. 29, 1952 |

FOREIGN PATENTS

| | | |
|---|---|---|
| 108,075 | Australia | Jan. 18, 1939 |
| 374,713 | France | Apr. 24, 1907 |
| 599,746 | France | Oct. 26, 1925 |